US011265365B2

(12) United States Patent
Hargrove et al.

(10) Patent No.: US 11,265,365 B2
(45) Date of Patent: Mar. 1, 2022

(54) PLATFORM-SPECIFIC THIN-CLIENT DELIVERY OF AN APPLICATION DEVELOPED ON A CLOUD-BASED ENTERPRISE-CUSTOMIZABLE MULTI-TENANT SERVICE INTERFACE

(71) Applicant: Net Law Group, Inc., Louisville, KY (US)

(72) Inventors: Alex J. Hargrove, Louisville, KY (US); Zlatko Selimanović Pažanin, Louisville, KY (US)

(73) Assignee: Net Law Group, Inc., Louisville, KY (US)

( * ) Notice: Subject to any disclaimer, the term of this patent is extended or adjusted under 35 U.S.C. 154(b) by 2 days.

(21) Appl. No.: 17/008,731

(22) Filed: Sep. 1, 2020

(65) Prior Publication Data

US 2020/0396274 A1 Dec. 17, 2020

Related U.S. Application Data

(63) Continuation-in-part of application No. 16/018,796, filed on Jun. 26, 2018, now Pat. No. 10,776,178.

(60) Provisional application No. 62/525,020, filed on Jun. 26, 2017.

(51) Int. Cl.
| | |
|---|---|
| *H04L 29/08* | (2006.01) |
| *H04L 67/04* | (2022.01) |
| *H04L 67/01* | (2022.01) |
| *H04L 67/1097* | (2022.01) |

(52) U.S. Cl.
CPC .......... *H04L 67/04* (2013.01); *H04L 67/1097* (2013.01); *H04L 67/42* (2013.01)

(58) Field of Classification Search
CPC ...... H04L 67/42; H04L 67/04; H04L 67/1097
See application file for complete search history.

(56) References Cited

U.S. PATENT DOCUMENTS

| | | |
|---|---|---|
| 8,171,418 B2 | 5/2012 | Law |
| 8,180,395 B2 | 5/2012 | Moran et al. |
| 8,332,435 B2 | 12/2012 | Ballard et al. |
| 8,489,575 B2 | 7/2013 | Miles et al. |

(Continued)

*Primary Examiner* — Tuan C Dao
(74) *Attorney, Agent, or Firm* — Patrick M. Torre; Stites & Harbison, PLLC (57) ABSTRACT

In a cloud-hosted computing system environment, a method for transparently providing a customized enterprise-specific interface application to an identified third-party marketplace platform includes receiving a front-end or a back-end request for a core functionality. A specific enterprise associated with the request is identified. An assembly program or a tenant service hosted by the cloud-hosted computing system environment, in real-time and transparently, selects a core application defined for a group of enterprises requiring a same functionality as the core functionality. According to the identified specific enterprise, the assembly program or tenant service applies, one or more predefined stored functionalities to the core application to provide an identified-enterprise-specific interface application. The assembly program or tenant service packages the identified-enterprise-specific interface application and a unique identifier associated with the specific enterprise for deployment in a platform-specific thin-client application shell to provide a platform and identified-enterprise-specific interface application.

20 Claims, 10 Drawing Sheets

(56) References Cited

U.S. PATENT DOCUMENTS

| | | |
|---|---|---|
| 8,549,359 B2 | 10/2013 | Zheng |
| 8,660,992 B2 | 2/2014 | Yoshida et al. |
| 8,726,240 B2 | 5/2014 | Gallagher et al. |
| 8,726,270 B2 | 5/2014 | Kane |
| 8,819,210 B2 | 8/2014 | Tammam |
| 8,839,209 B2 | 9/2014 | Gallagher et al. |
| 8,910,278 B2 | 12/2014 | Davne et al. |
| 8,972,439 B2 | 3/2015 | Mathew et al. |
| 9,075,693 B2 | 7/2015 | Sporkert et al. |
| 9,417,860 B2 | 8/2016 | Cohen et al. |
| 9,501,453 B2 | 11/2016 | Gasn et al. |
| 9,600,575 B2 | 3/2017 | Forsberg et al. |
| 10,402,076 B2 | 9/2019 | Sherman et al. |
| 10,445,083 B2 | 10/2019 | Kirkpatrick |
| 10,467,025 B2 | 11/2019 | Kirkpatrick et al. |
| 10,776,178 B2 | 9/2020 | Hargrove et al. |
| 2002/0054587 A1* | 5/2002 | Baker .................. G06Q 10/107 370/352 |
| 2005/0163136 A1* | 7/2005 | Chiu .................... H04M 3/4938 370/401 |
| 2005/0222931 A1 | 10/2005 | Mamou et al. |
| 2005/0283374 A1* | 12/2005 | Salomon ................ G06F 16/86 705/1.1 |
| 2008/0311886 A1* | 12/2008 | Smith ..................... H04L 69/24 455/412.1 |
| 2011/0238506 A1 | 9/2011 | Perkowski et al. |
| 2011/0289307 A1 | 11/2011 | Humprecht |
| 2012/0324069 A1 | 12/2012 | Nori et al. |
| 2013/0159378 A1 | 6/2013 | Misovski et al. |
| 2016/0301679 A1 | 10/2016 | Mortimore, Jr. et al. |
| 2017/0171146 A1 | 6/2017 | Sharma et al. |
| 2017/0236160 A1 | 8/2017 | Oberoi et al. |
| 2017/0324714 A1 | 11/2017 | Wainner et al. |
| 2017/0330121 A1 | 11/2017 | Sullivan et al. |
| 2018/0034901 A1 | 2/2018 | Shnitko et al. |
| 2018/0302877 A1 | 10/2018 | Bosch et al. |

* cited by examiner

```
{
"signals" : ["QR Code","Url","NFC","Beacon"]
}
```

Signal Mapping

```
{
"signals" : [
    {
        "key" : "pos.clientx.com",
        "format" : "url",
        "identifier" : "POS-PLAT"
    },
    {
        "key" : "vault.clientx.com",
        "format" : "url",
        "identifier" : "VAULT-PLAT"
    }
  ]
}
```

Application Definitions:

```
{
    "application" : {
        "identifier" : "POS-PLAT",
        "name" : "Point of Sale",
        "platforms" : [
            "Web",
            "Android",
            "iOS"
        ],
        "modules" : [
            "invoicing",
            "product Management"
        ],
        "assets" : {
            "content" : {
                "images" : "/imgs",
                "js" : "/js"
            }
        }
    }
}
```

FIG. 4

502 — TENANT

| id | BOE |
|---|---|
| name | Bank of Earth |
| domains | vault.bankofe.com |
| certificates | *.bankofe.com, sha256RSA, DNS=*.bankofe.com, KU=DigitalSignature, KeyEncipherment, EKU=ServerAuthentication |
| layout | default |
| styling | primary-color: #adadad<br>secondary-color: #df34ac<br>icon: mainlogo.svg<br>header: header.*.png |
| assets | mainlogo.svg, header.640dpi.png, header.320dpi.png |
| configurations | ANALYTICS_APIKEY: f9WaWOnkQYXrdjNIAnoUFO<br>VAULT_DEFAULT FOLDERS: Legal Documents, Public |

504 — domains
506 — certificates
508 — (layout, styling, assets, configurations)

510 — SUBSCRIPTION

| tenant | BOE |
|---|---|
| plan | BASIC_VAULT |
| period | 2 years |

512 — plan

SUBSCRIPTION

| tenant | BOE |
|---|---|
| plan | EXTERNAL_UPLOAD_ADDON |

FIG. 5

| 512a | PLAN | |
|---|---|---|
| 600 | id | BASIC_VAULT |
| | description | Vault with included encryption. |
| 610 | modules | VAULT |
| 620a | features | VAULT_BASIC(limit:10G), VAULT_ENCRYPTION |
| | pricing | $x.xx/month |

| 512b | PLAN | |
|---|---|---|
| 600 | id | EXTERNAL_UPLOAD_ADDON |
| | description | Vault API access for document upload. |
| 610 | modules | VAULT |
| 620b | features | VAULT_EXTERNAL_UPLOAD |
| | pricing | $x.xx |

FIG. 6

312 — MODULE

| | |
|---|---|
| id | VAULT |
| version | 1.0.0 |
| description | White-labeled storage with optional encryption, syncing and external uploads. |
| features | { id: VAULT_BASIC, description: Basic vault features., parameters: [ { name: limit, description: Storage limit per user., type: byte_size } ] }, { id: VAULT_ENCRYPTION, description: Content encryption at rest. }, { id: VAULT_EXTERNAL_UPLOAD, description: Content upload using API calls. } |
| configurations | { id: VAULT_DEFAULT_FOLDERS, description: List of initial folders for the user. }, { id: VAULT_DISABLE_REST_ENCRYPTION, description: Disables encryption., type: boolean } |
| assets | icon_folder.svg, icon_file.svg, icon_file_pdf.svg, lv-module-vault.html, service.js, ... |

700 — features
700a — (VAULT_BASIC)
700b — (VAULT_ENCRYPTION)
700c — (VAULT_EXTERNAL_UPLOAD)

PLATFORM-SPECIFIC THIN-CLIENT DELIVERY OF AN APPLICATION DEVELOPED ON A CLOUD-BASED ENTERPRISE-CUSTOMIZABLE MULTI-TENANT SERVICE INTERFACE

This application is a continuation-in-part of U.S. patent application Ser. No. 16/018,796 filed on Jun. 26, 2018, now U.S. Pat. No. 10,776,178, which in turn claims the benefit of priority in U.S. Provisional Patent Appl. Ser. No. 62/525,020 filed on Jun. 26, 2017, the entire disclosure of each of which is incorporated herein by reference.

TECHNICAL FIELD

The present disclosure relates to methods for delivering multi-tenant, cross-platform (mobile, web, etc.) applications to small businesses and enterprises using a multi-tenant architecture, whereby an end-user is presented with an app specific to a particular enterprise without awareness that she is using a multi-tenant application.

BACKGROUND

Enterprises looking to deliver mobile applications to their clients, customers, or other end-users face many obstacles. Often millions of dollars are spent either with in-house development teams or third-party contractors to develop and deliver native, mobile applications to the popular marketplaces (for example, Google® Play, iStore, and Apple Store®) often building separate versions for web and tablets. As an example, a particular type of cloud-hosted app may require tens or even hundreds of iterations to accommodate different operating systems (iOS, Android®, etc.). Further, because the organizations are not in the business of delivering technology products of this nature, they require substantial time and resources merely to get the apps to market. Once published in the existing marketplaces, the business further has the challenge of maintaining and updating the app both in response to operating system changes that create bugs or responding to user feedback and otherwise continuing to develop and deliver value to end-users in a timely manner.

In turn, "white label" app (i.e., multi-tenant app) providers offer enterprise-specific apps, for example multi-party mortgage applications to multiple separate businesses or entities. However, user experience and app quality suffer because of the inefficiencies inherent in maintaining multi-tenant apps or multiple business-specific apps.

The present disclosure seeks to remedy these and other problems by providing for a marketplace whereby enterprises or small/midsize businesses can select an app, such as the "Vault" described as an example below, provide the necessary information required to customize and brand a core application, and deliver it to their end-users on a service basis directly through a subdomain on their site, all without having to create a new instance of the core application. From there, the organization can expect to benefit from regular updates and improvements to the application by its developer(s), including the introduction of new features that are automatically deployed with no downtime or need to involve IT, and with no updates or installs or other actions required by the end user of the application to utilize the new version. Further, by the methods described herein additional efficiencies are realized by app developers in that only one build of code must be supported, rather than multiple builds for multiple separate entities.

As a non-limiting example, online data storage and service provision, including cloud-based data storage and service hosting, is an important component of a variety of enterprises. In the specific context of enterprises such as estate planning, for example, secure cloud storage of important documents such as deeds, insurance policies, tax returns, estate planning documents, etc. provides a safe, reliable method of keeping such documents without requiring physical storage space, reducing risk of damage of physical copies of same. This need for secure, convenient cloud-based storage in virtual "safety deposit boxes" extends to innumerable other enterprise and indeed individual endeavors, for example photo storage, legal documents, banking statements and related documents, and others.

It is important to any enterprise to be able to provide a recognizable, "branded" look and feel to any and all of its goods and services, including cloud-hosted services. As with any service, such branding aids in ensuring customer recognition, loyalty, etc. That is, Enterprise X, when offering a service as a secure, cloud-based app (as non-limiting examples, an online storage system such as a virtual safety deposit box, a mortgage app, an online banking app, an employee intranet app, and others) wants to provide such a system that includes a user interface or other means that is instantly recognizable to a customer as being Enterprise X-specific, much as a customer would instantly know that she is accessing and using a physical safety deposit box provided by a brick and mortar enterprise. The enterprise could go to the trouble and expense of creating such a "branded" cloud-based storage system itself or commissioning a developer to create one. Smaller enterprises in particular may not be willing or able to incur the expense of developing and maintaining a dedicated, "one-off" online storage system for their enterprise.

Today, businesses creating cloud-based solutions typically also require a mobile app to supplement a web-based product. This requires, however, cost and support for additional mobile apps (for example, iStore & Google Play) in addition to maintaining the web-based product. Even when upfront costs are manageable, the cost to maintain, fix bugs, improve, etc. is cost prohibitive for most small businesses. And even for larger businesses, the complexity and time delays of depending on third parties to approve and implement changes can be not only challenging but simply a roadblock too many companies aren't willing to maneuver around.

Another problem relates to new releases of mobile app technology releases, i.e. upgrades, by third parties such as Google and/or Apple, or white label app companies in the business of selling such apps. When upgrades occur, the third parties typically do not ask business owners with apps on their platform whether they have built in their apps the programming necessary to anticipate the updates. This means an update could leave a mobile app user of a business suddenly unable to effectively operate the business owner's mobile app. So, in addition to issues of time and cost, by use of mobile apps a business is subjecting its business reputation on technology that such business cannot dictate or otherwise control.

One potential solution is a Progressive Web App, which can address the above-summarized issues of cost and dependency of current mobile apps offered by third parties such as Google and Apple. The problem, however, is that if a business is dependent upon creating its own Web App, the cost is likely going to dictate that certain functionalities of a Web App may only be financially feasible to larger organizations that have the resources to develop and maintain their own native Web App.

For these and other reasons, there is a need for a cloud-based, enterprise-customizable (i.e. "branded") multi-tenant service interface which can automatically provide the enterprise-branded look and feel of the user interface presented to a user of the system. The presently described cloud-based enterprise-customizable service interface satisfies this need in the art by providing a cross-platform application that functions in most respects like a native app on mobile devices but is also designed to deliver an optimized experience on desktop, tablet, and other computing devices, or for that matter any computing device having internet access.

Further, by use of a common platform which is automatically customizable according to the identity of an enterprise as will be detailed below, simultaneous availability to/use by multiple enterprises is advantageously made possible, while still presenting an individually enterprise-branded front to a user, all from a single build of code. By use of the system described below, enterprises are able to overcome the challenges described above by delivering cross-platform applications directly through their website to the end-users which are maintained by a third-party dedicated to supporting and improving that application and ultimately to use said application to promote customer loyalty, customer interactions with the enterprise, and marketing opportunities between the enterprise and the customer are improved and enhanced.

The methods described herein provide for compiling a user interface and enterprise-specific application after an enterprise is identified as set forth below in a manner specific to that enterprise, such as by providing enterprise-specified style and branding, all from a single build of the application and without requiring the end-user to install or otherwise download the application from a native app store. Further, the present disclosure details the cloud-based services utilized to deliver that enterprise-specific application to the enterprise's end-users (the enterprise or businesses clients, customers or employees) while requiring only nominal effort on the part of that organization's information technology (IT) group. Still more, unlike prior art methods for delivering a single app to multi-tenants each with their own end-users, the present disclosure describes methods providing for multi-tenancy without the end-user even being aware they are using a multi-tenant (also known as a "white label") application.

SUMMARY

In accordance with the purposes and benefits described herein, in one aspect, in a cloud-hosted computing system environment, methods for transparently providing a customized enterprise-specific interface application to an identified third-party marketplace platform are provided. The methods comprise receiving a front-end or a back-end request for a core functionality and identifying a specific enterprise associated with the request. An assembly program or a tenant service hosted by the cloud-hosted computing system environment, in real-time and transparently: i) selects a core application defined for a group of enterprises requiring a same functionality as the core functionality; ii) according to the identified specific enterprise, applies one or more predefined stored functionalities to the core application to provide an identified-enterprise-specific interface application; and iii) packages the identified-enterprise-specific interface application and a unique identifier associated with the specific enterprise for deployment. The application is packaged in a platform-specific thin-client application shell to provide a platform and identified-enterprise-specific interface application. Optionally, the method may include applying a filtering step to determine a status of the identified specific enterprise.

The methods may include a step of pushing the platform and identified-enterprise-specific interface application to the identified third-party marketplace platform or caching the platform and identified-enterprise-specific interface application for later pushing or retrieval. In embodiments, the specific enterprise may be identified by one or both of an enterprise-associated domain or subdomain identifier and a unique authentication code.

In embodiments, the one or more predefined stored functionalities may be provided as one or more stored files defining modules providing additional identified-enterprise-specific application functionalities, enterprise-specific templates, and enterprise-specific assets. Various modules are contemplated, including without intending any limitation a plurality of user interface views, a plurality of menu options, a plurality of menu layouts, and a plurality of attendant services such as one or more enterprise-specific encryption services. Other modules may include one or more tags identifying enterprise-customizable core application elements. The enterprise-customizable application elements may be selected from one or more of a plurality of cascading style sheet (CSS) properties, a plurality of shell colors, a plurality of button styles, a plurality of text font styles, and a plurality of image size and/or resolution definitions, among others.

In the following description, there are shown and described several preferred embodiments of the described methods and systems. As it should be realized, the methods and systems are capable of other, different embodiments and their several details are capable of modification in various, obvious aspects all without departing from the methods and systems as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the described methods for providing a cloud-based, enterprise-customizable multi-tenant application and service interface deliverable by a third-party marketplace or platform, and together with the description serves to explain certain principles thereof. In the drawing figures.

Reference will now be made in detail to the present preferred embodiments of the described methods for providing a cloud-based, enterprise-customizable multi-tenant application and associated service interface in a third-party marketplace or platform, examples of which are illustrated in the accompanying drawing figures.

DETAILED DESCRIPTION

Any citations or other references included or referred to in this application form a part of the disclosure and are incorporated herein in their entirety by reference. It will be appreciated that the embodiments described herein are an illustration of one of the modes best suited to carry out the invention. The described methods are capable of other different embodiments, and its several details are capable of modification in various, obvious aspects all without departing from the invention. For example, for convenience certain of the examples provided herein relate to a secure, cloud-based app providing an online storage system such as a virtual safety deposit box. However, the skilled artisan will readily realize that the described methods, and systems incorporating the methods, may define apps providing innumerable other types of services provided securely as cloud-hosted apps, for example a mortgage app, an online banking app, an employee intranet app, and many others. Accordingly, the descriptions provided herein will be regarded as illustrative in nature and not as restrictive.

At a high level, the present disclosure relates to developing a customized, enterprise-specific service interface app from a core application usable by a group of enterprises having some commonality, i.e. requiring a similar cloud-based service or functionality. Such core applications may be developed according to existing standards and frameworks for progressive web applications and packaged for deployment as a graphical user interface (GUI) for use by the enterprises. Then, by a package of predefined fetchable options, on identification of a particular enterprise or user-enterprise relationship or association, the GUI is customized to build an app that is recognizably associated with a particular enterprise, i.e. "branded" to the enterprise. That app may be pushed to the enterprise or directly to the customer for use in a manner that is transparent. That is, the customer or end-user is provided the appearance of using an enterprise-specific app but is unaware that she is in fact using a multi-tenant application.

In one embodiment, this may be implemented by identifying a specific domain or subdomain associated with a specific enterprise. In other embodiments, this may be implemented by a specific input provided by a user or the enterprise, the input associated with a specific enterprise.

As part of the system, a development kit is provided including various stored tools for providing/customizing the GUI/creating the app described above. The development kit allows packaging an application for publication or listing on a so-called "enterprise marketplace" or for direct sales (for example, B2B or by a single developer/company). Elements of the development kit may be stored locally or remotely. Without intending any limitation, these may comprise one or more proprietary config or manifest files providing a listing of available modules, enterprise-specific templates, and enterprise-specific assets. These proprietary config or manifest files would be applied as needed to assemble the app on identification of a participating enterprise.

The modules define particular functionalities, for example user interface (UI) views, menu options, layouts, and connections to backend services such as encryption services. The style templates can include tags to identify elements for which enterprise-specific customization is available. This can include modifying such elements as to CSS properties, i.e. shell color, button style, font style for text within the element, etc. Other tags may mark assets as customizable according to other features, for example by way of one or more image files uploaded with guidelines regarding image size/resolution.

Figure 1:
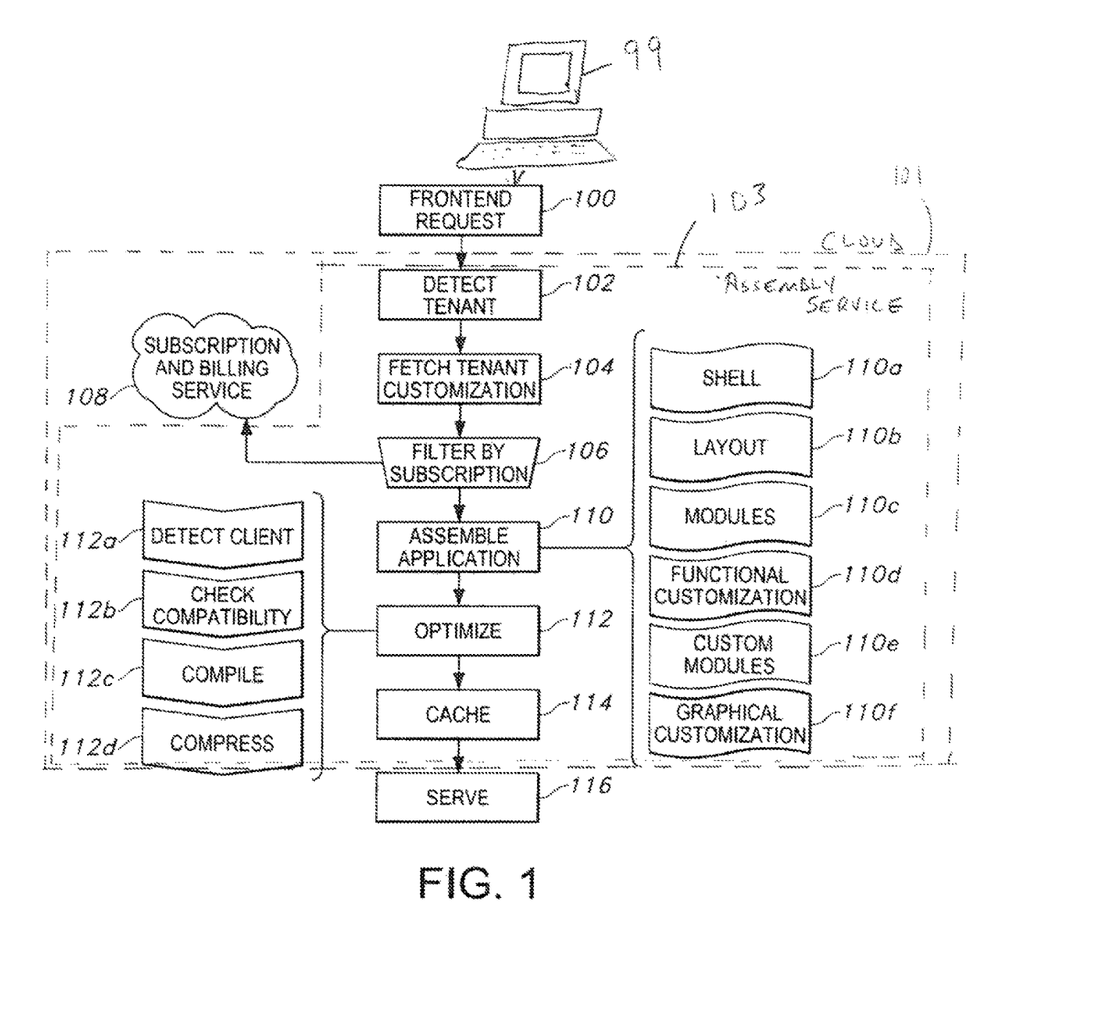
FIG. 1 illustrates in flow chart form a front-end method for providing a cloud-based, enterprise-customizable multi-tenant application and service interface according to the present disclosure.

This is illustrated in flow chart form in FIG. 1. As shown, on receipt of a front-end request from a user, i.e. interacting directly with the application (step 100), a filtering step of identification of a participating enterprise is undertaken (step 102). Once the participating enterprise is identified, predetermined enterprise customizations are fetched (step 104) for compiling with a core application (i.e. a common platform or template providing a desired functionality such as a cloud-hosted document storage service, a mortgage app, an online banking app, and others). Other steps may be undertaken. For example, an optional further filtering step may be applied (step 106) to identify a subscription status of the enterprise. This may be accomplished by reference to a separate database (step 108) that defines the plans and subscriptions available and returns the list of features, modules, etc. specific to that enterprise according to the enterprise subscription status, allowing generation of suitable billing or invoicing to the enterprise or identifying customization options available to the enterprise according to their subscription status. Thus, for example, an enterprise availing itself of a demo model or a base subscription package may be entitled to a base package of available customizations, modules, templates, etc. On the other hand, an enterprise availing itself of higher-level subscription packages would be entitled and provided access to additional available customizations, modules, templates, etc.

Next (step 110), the app is assembled. This requires variously fetching a shell or common template (step 110a), and determining a predetermined layout required by the enterprise (step 110b). A predetermined, enterprise-specific module or modules are fetched, defining as described above specific functionalities required by the enterprise. Application of further functional customization (step 110d) and/or enterprise-specific custom modules (step 110e) is contemplated. Finally, any graphical customization required by the enterprise is applied (step 110f). Thus, the app is assembled at runtime, i.e. on receipt of the front-end request and identification of the user.

After assembly, an optimization step may be undertaken (step 112). This may variously include detecting an enterprise or enterprise customer desiring to use the app (step 112a), checking for compatibility with the enterprise and/or customers' computing system, including determinations of features such as operating systems, processor speeds, available memory, speed of internet or wi-fi connection, and others (step 112b), compiling the app for delivery (step 112c), and a step of compressing (step 112d) to reduce bandwidth required to deliver the app. The app may then be directly pushed to the enterprise or enterprise customer or may be cached for retrieval by the enterprise or enterprise customer (step 114), and then delivered (step 116).

Figure 2:
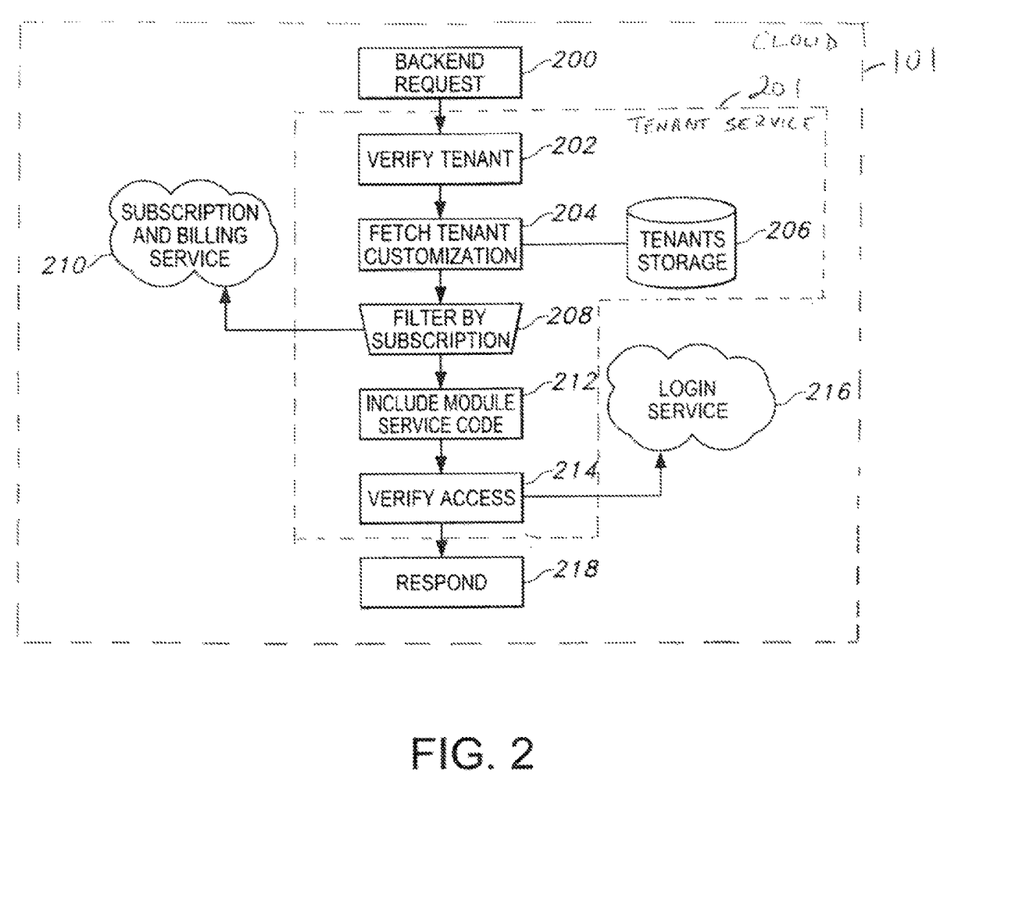
FIG. 2 illustrates in flow chart form a back-end method for providing a cloud-based, enterprise-customizable multi-tenant application and service interface according to the present disclosure.

Alternatively (see FIG. 2), on receipt of a backend request (i.e., via a separate application or program serving indirectly with the front-end service) from a participating enterprise (step 200), the participating enterprise is verified (step 202). On verification, a specific pool of enterprise customizations is fetched (step 204), such as from a remotely or locally stored database (step 206) of enterprise-specific modules, templates, etc. As before, a further filtering step may be applied (step 208) to identify a subscription status of the enterprise such as by reference to a subscription service (step 210) of subscription levels according to enterprise. The process may include a module service code (step 212). Still more, the process may require a verification step (step 214), such as by a login service (step 216). On completion (step 218) as before the app may then be directly pushed to the enterprise or enterprise customer or may be cached for retrieval by the enterprise or enterprise customer, and then delivered.

Figure 3:
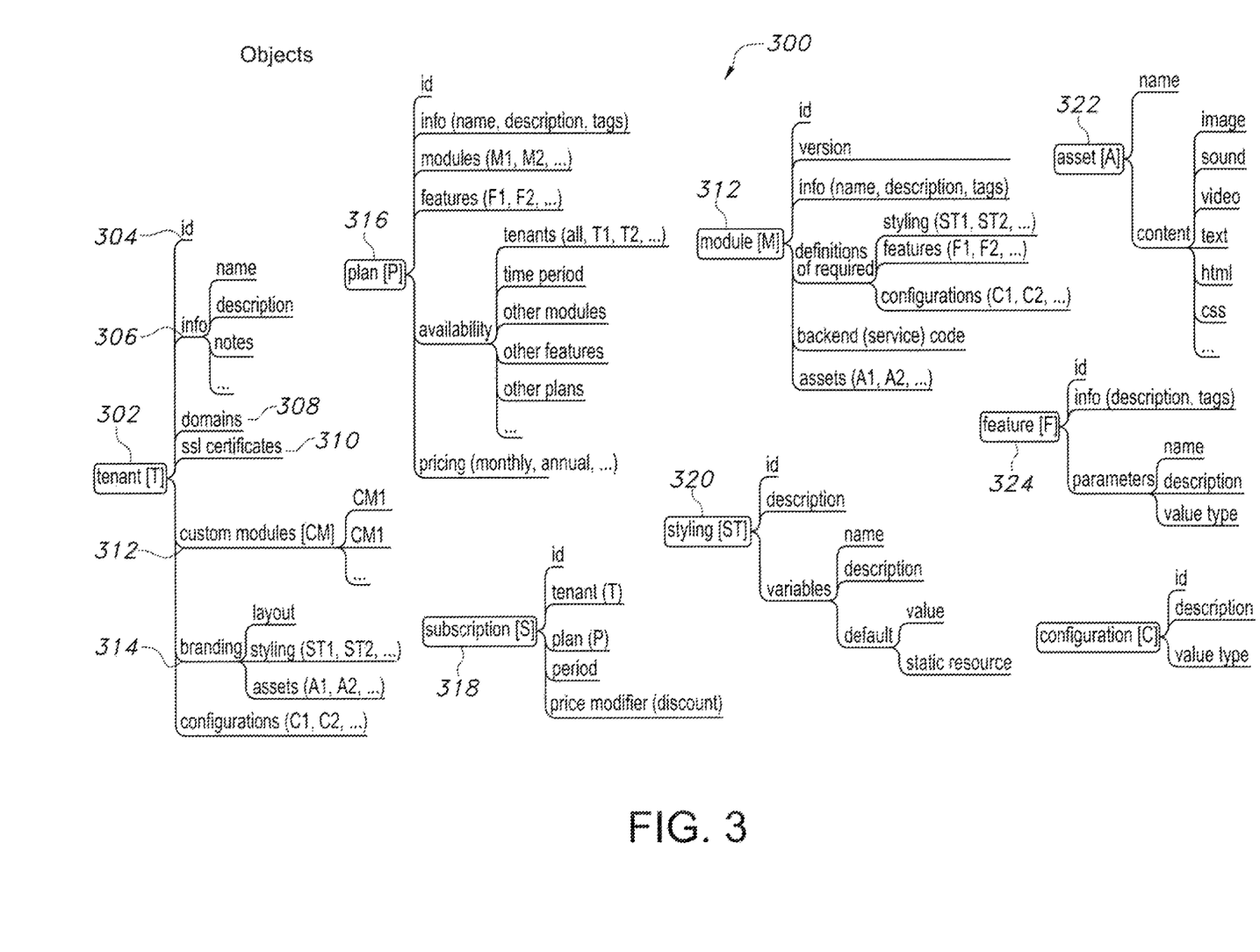
FIG. 3 illustrates a non-limiting selection of objects for customizing a cloud-based, enterprise-customizable multi-tenant application and service interface according to the present disclosure.

FIG. 3 illustrates a non-limiting listing of objects 300 which may be associated with particular elements of a particular enterprise and with the described enterprise-customizable application, and which may be stored in one or more remote or local databases for subsequent fetching. As examples, a particular enterprise 302 (tenant T) may be associated with a unique identification code 304 and particular background information 306 (enterprise name, description, etc.), with specific domains/subdomains 308, with a particular set of SSL certificates 310, etc. The enterprise may further be linked to a particular grouping of custom modules 312 (CM1 . . . x), a particular branding scheme 314 defined by app layout, styling codes ST1 . . . x), and a listing of customizable assets A1 . . . x). The stored database(s) of objects may further include specific predetermined plans 316 including predetermined sets of modules, features, availabilities, and pricing. Likewise, the stored database(s) of objects may include predetermined subscription levels 318 defining availability to an enterprise of plans, terms, pricing, etc. according to subscription level. Variously, pools of modules 312, stylings 320, assets 322 (images, sounds, video clips, text styles/fonts, html codes, CSS, etc.), features 324, and configurations 324 may be stored and available for fetching in addition to or in lieu of customized modules, stylings, etc. according to predetermined enterprise requirements.

As described above, on identifying a domain/subdomain 308 associated with a specific enterprise (tenant 302) and thereby a particular user-enterprise relationship or association, the GUI is customized to build an application or app that is recognizably associated with a particular tenant 302 with whom the user is associated, i.e. that is "branded" to the enterprise. That app may be pushed to the customer for use.

Figure 4:
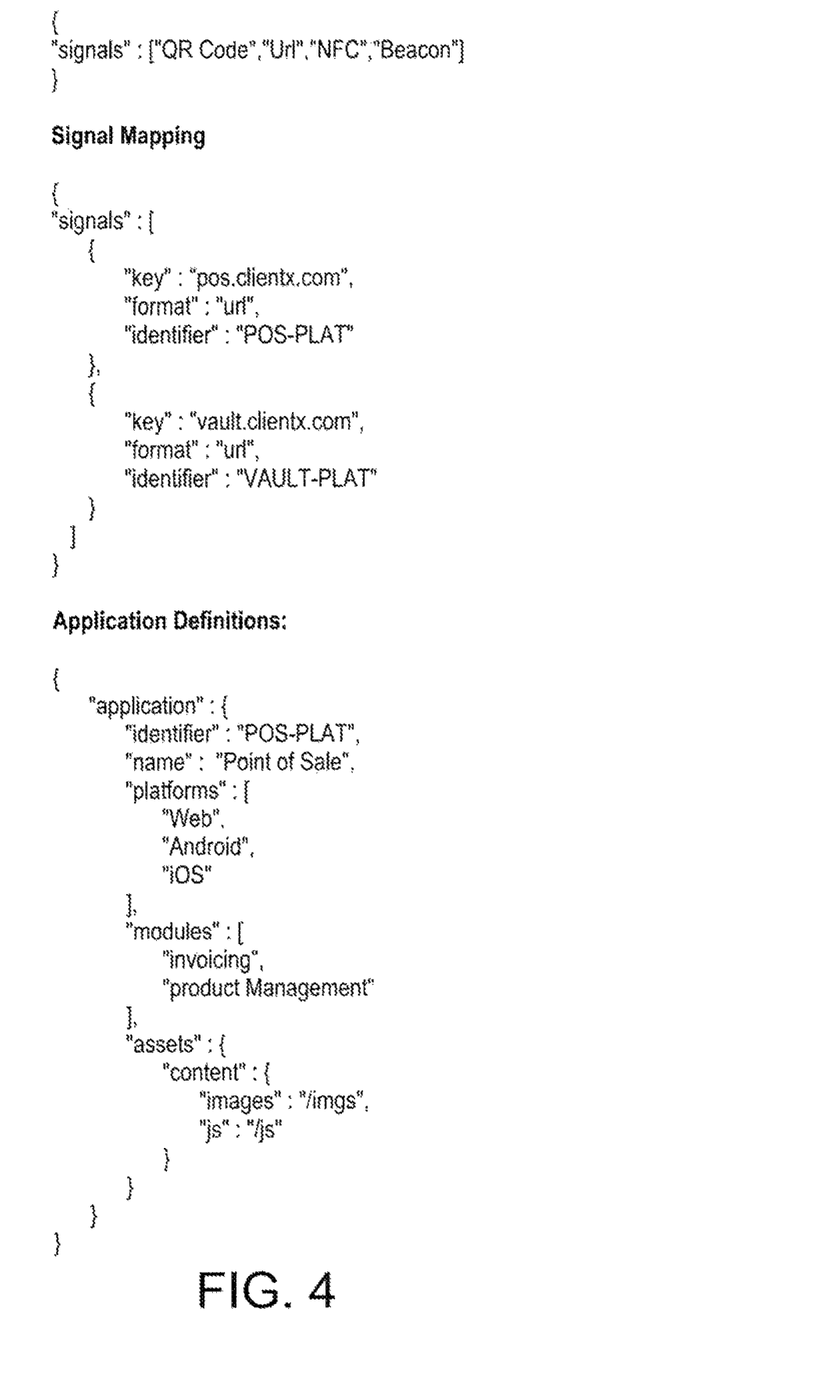
FIG. 4 illustrates a representative coding scheme for authenticating a user.

In an alternative embodiment (see FIG. 4 illustrating a representative, non-limiting coding scheme), the app build may be triggered by a unique authentication input provided by the enterprise or a user. This input may be provided according to a number of known technologies, including without intending any limitation unique QR codes, unique URLs, near field communication (NFC) or other wireless technology, passwords, biometric inputs, and others. The unique authentication input need only be capable of providing sufficient information to identify the enterprise or a user associated with the enterprise, after which the process of building the app is initiated as described above. As will be appreciated and as is illustrated in the representative coding scheme, the process is context-aware and not only identifies the tenant 302 but also according to the identified tenant 302 launches the predetermined modules 312, assets 322, and functionalities for the app. Thus, the app is built at runtime rather than requiring pre-building and storage, such as in a third-party app store.

Figure 5:
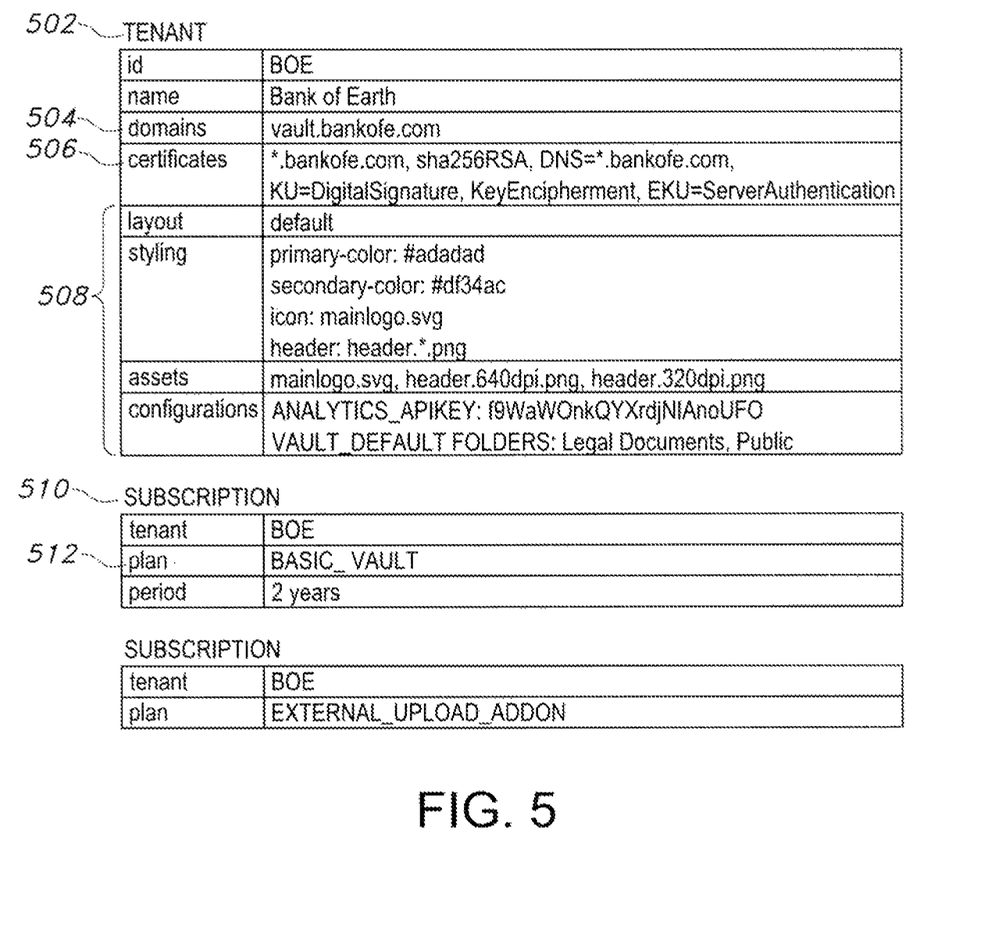
FIG. 5 illustrates a representative tenant identification for use in the described methods.

FIG. 5 illustrates a representative embodiment of the above-described enterprise-customizable service interface. A tenant 502 (designated in the Figure as the enterprise "Bank of Earth" or "BOE") desires to provide secure, cloud-based storage of monthly reports for its customers. BOE identifies a subdomain DNS record 504 (vault.bankofe.com) linking to the system of the present disclosure and maintains one or more SSL certificates 506 for that subdomain. BOE may also provide a listing or database of customers, updatable by BOE.

Then, a new enterprise or tenant specific definition or manifest file 508 is created defining the enterprise (BOE) specific modules, a description of the storage vault capabilities (optional encryption, syncing, external upload, etc.), the features (basic features, storage limits per user, etc.), configurations, and assets all providing a BOE-branded cloud-based document storage system as an app, created as described above and published to BOE, which BOE may then offer to its customers. Optionally, a subscription level 510 is set as described above, in the depicted example providing a cloud-hosted document storage "vault" plan 512 (BASIC_VAULT) allowing external uploads thereto by BOE for a period of 2 years.

Figure 6:
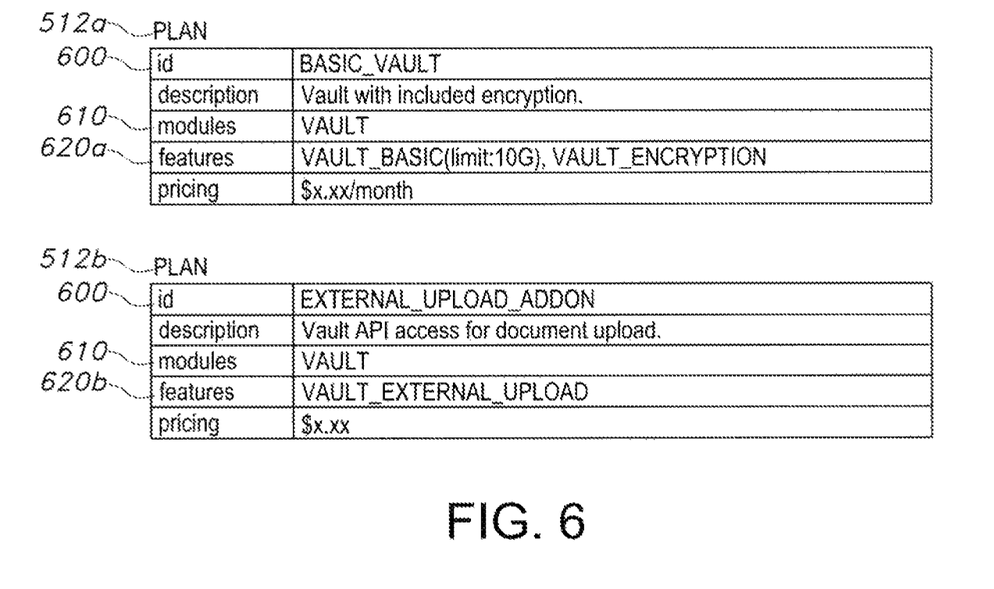
FIG. 6 illustrates representative plan descriptions for use in the described methods.

As shown in FIG. 6, multiple plans may be defined including specific features and parameters. For example, a BASIC_VAULT plan 512a tagged with an id 600 of BASIC_VAULT includes a basic functionality module 610, in the depicted example defining a secure cloud-based document storage service (VAULT). Particular features 620a may be defined for the module, including a particular storage size (10G) and encryption. A different plan 512b may define different features 620b, for example API access for document upload by a tenant 302.

Figure 7:
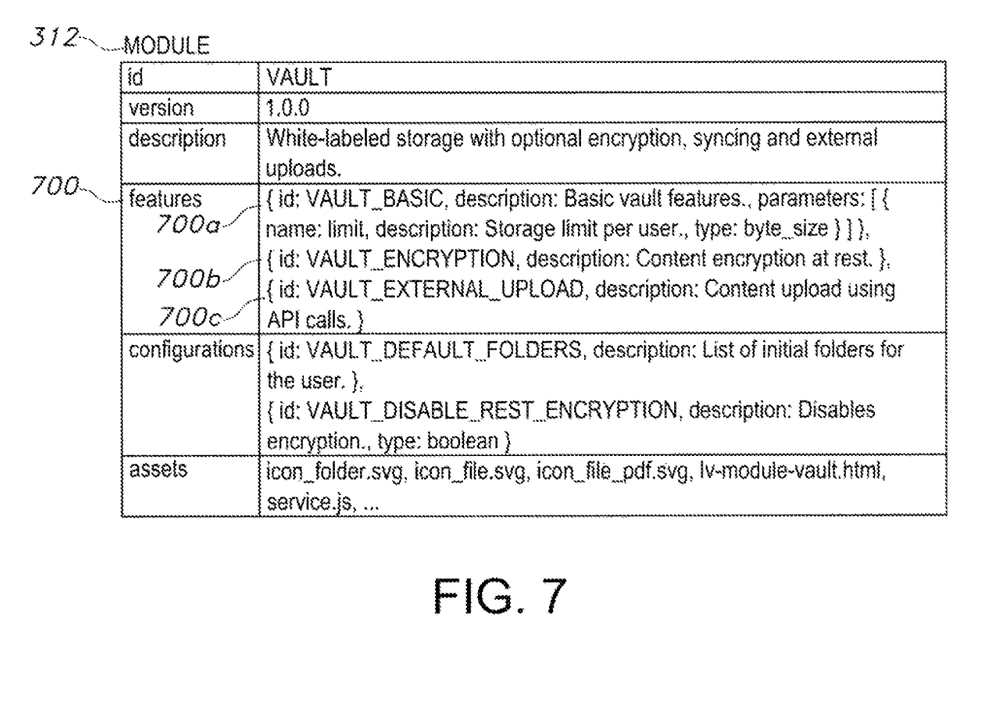
FIG. 7 illustrates representative module iterations for use in the described methods.

In turn, modules 312 having various functionality may be defined and stored. In the embodiment depicted in FIG. 7, again referring to the example of a cloud-based secure document storage service (VAULT), various versions including differing features 700 may be stored, for example a basic version 700a as described above, an intermediate version 700b providing encryption, and a high-end version 700c providing storage, encryption, and API access for document upload. Likewise, as described above various configurations 702 and assets 704 may be associated with the module 312.

The result is when a customer loads the app, a user interface specific to the organization from which the user is identified as belonging is assembled in real-time, including the organizations branding, any custom modules, style and similar customizations. In turn, BOE is provided the benefits and advantages of a customized, BOE-branded app/cloud-based document storage service to offer to its customers, without having to devote time and expense to creating and maintaining a "one-off" service of that type. Still more, the assembly is transparent to the user. In other words, the user sees only the BOE-branded and customized app/cloud-based document storage service but is unaware that the specific BOE-branded and customized app was assembled at runtime on accessing the user interface, rather than being hosted and maintained by BOE.

Figure 8:
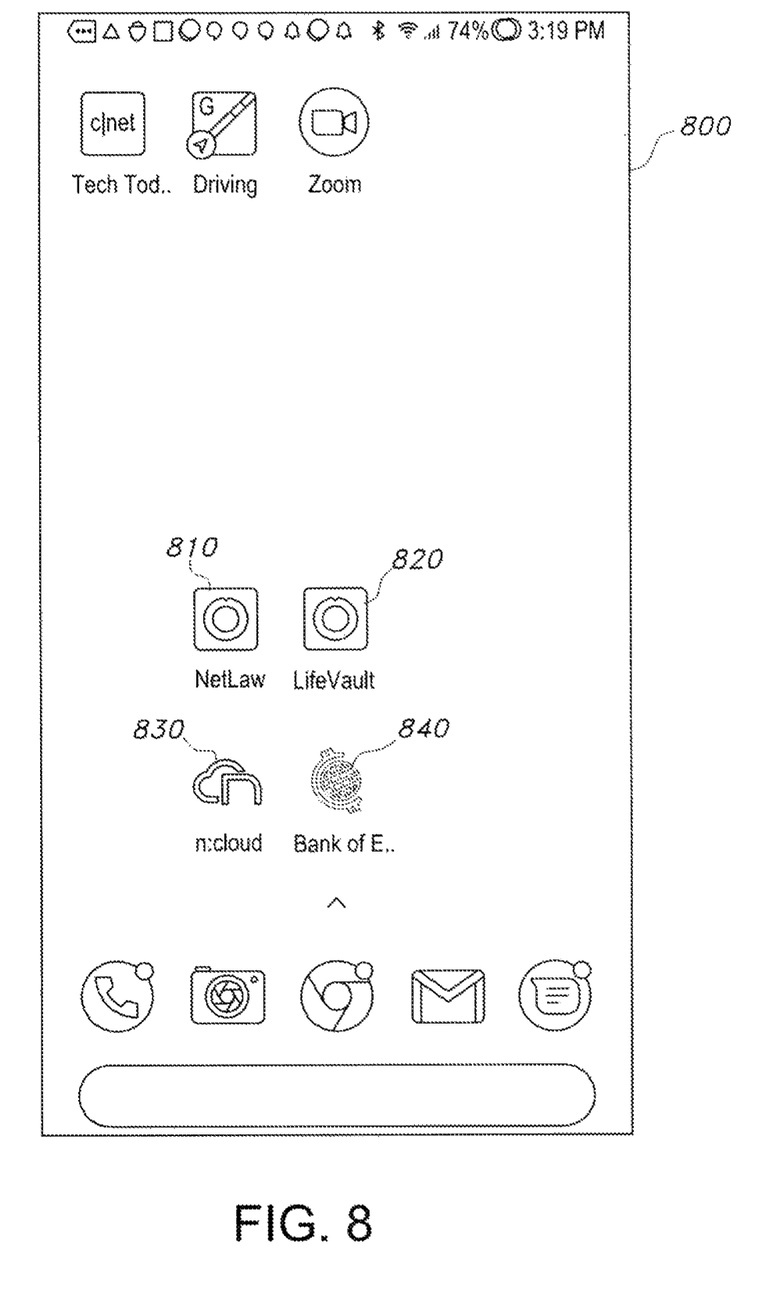
FIG. 8 illustrates a representative user interface generated by the methods according to the present disclosure.

This is illustrated in FIG. 8, showing a user interface 800 including various GUIs 810, 820, 830, and 840. As shown therein, each GUI is displayed with tenant 302-specific branding. However, by the methods described above, accessing a particular GUI 810, 820, 830, and 840, once the access is authenticated as described above, will cause to be assembled at runtime a core application (cloud-based secure document storage service in the depicted embodiments) modified according to the steps described above to provide an enterprise specific application, in the depicted embodiments being a cloud-based secure document storage service customized according to enterprise requirements.

In other embodiments, despite the problems with distributing apps by way of native app platforms as described above enterprises may wish to transparently package the above-described enterprise-customizable service interface by way of such a third-party platform or marketplace due to the commercial advantages attendant to maintaining a presence on such third-party marketplaces. Enterprises able to transparently provide the enterprise-customizable service interface in the manner described above but also through popular third-party marketplaces enjoy a potentially broader market reach and presence compared to enterprises making an app available through only a single commercial channel. Moreover, use of a native app in contrast to a native-like app (for example, a Progressive Web App) may allow access to features on a target computing device or platform that are available only to native apps. One non-limiting example is access to Bluetooth® technology.

Limitations attendant to providing native apps to multiple enterprises via an enterprise-customizable service interface as described above include, as one example, that in the event of a change to a core service an enterprise providing a native app would be required to entirely rebuild and re-deploy the app to the third-party marketplace. This creates a significant burden on the enterprise and hinders the ability to upgrade its app. Further, the need to update not only the app but any dependent applications each time a new feature or improvement to core services of the enterprise-customizable service interface is provided significantly hampers innovation. This problem increases exponentially as a direct function of the number of users of the enterprise-customizable service interface.

To solve this problem, the present disclosure provides for delivering the described cloud-based, enterprise-customizable multi-tenant application and associated service interface by way of a third-party marketplace or platform using a thin client. As is known, a thin client is a delivery system for an application that provides limited to virtually no functionality of itself. The thin client is designed to render an application from a remote server wherein the enterprise-customizable multi-tenant application and service interface is defined almost entirely by the service provider, in contrast to a client package calling the services (i.e. wherein the service functionalities are rendered on the client-side). By the mechanism of delivering the enterprise-customizable multi-tenant application and service interface using a thin client, the end user is not required to interact with the application, for example working with a database or installing a program as is required for a native app. In turn, the desirable feature of an enterprise-customizable multi-tenant application and service interface delivered to a user transparently and in real-time as discussed above is preserved.

Figure 9:
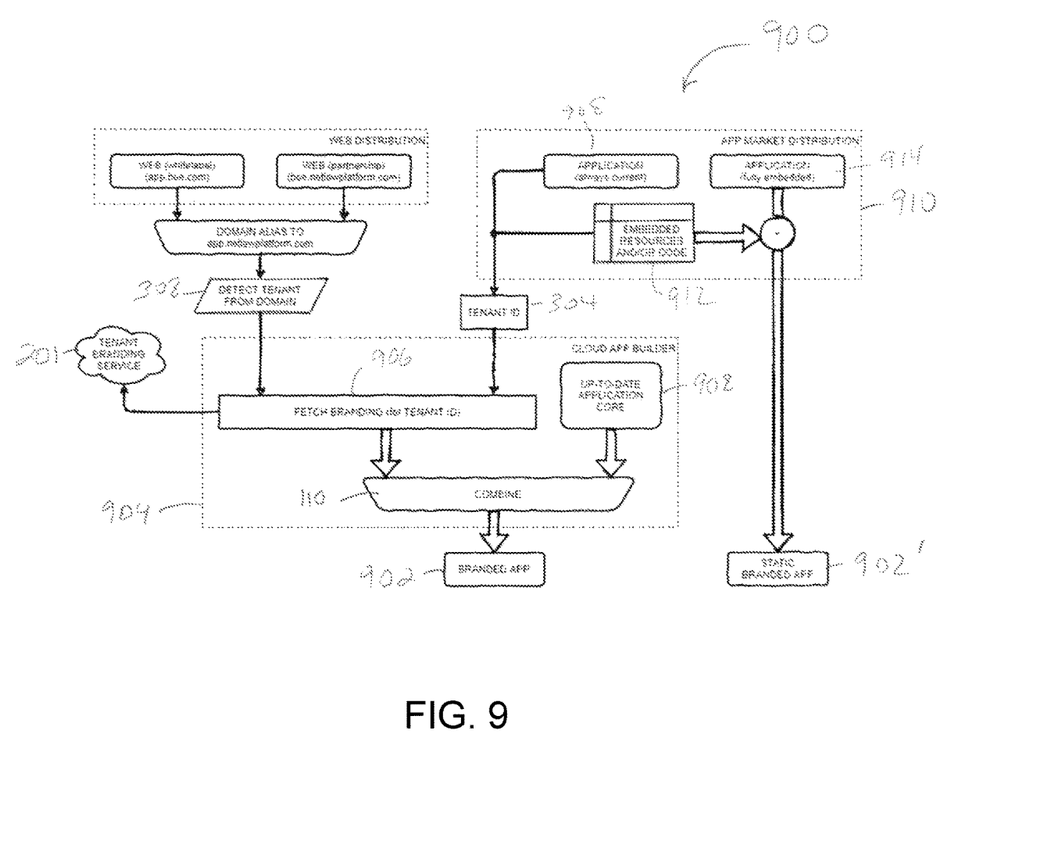
FIG. 9 illustrates a method for providing a cloud-based, enterprise-customizable multi-tenant application and service interface according to the present disclosure including options for deploying to a web browser environment or a third-party marketplace or platform.
Figure 10:
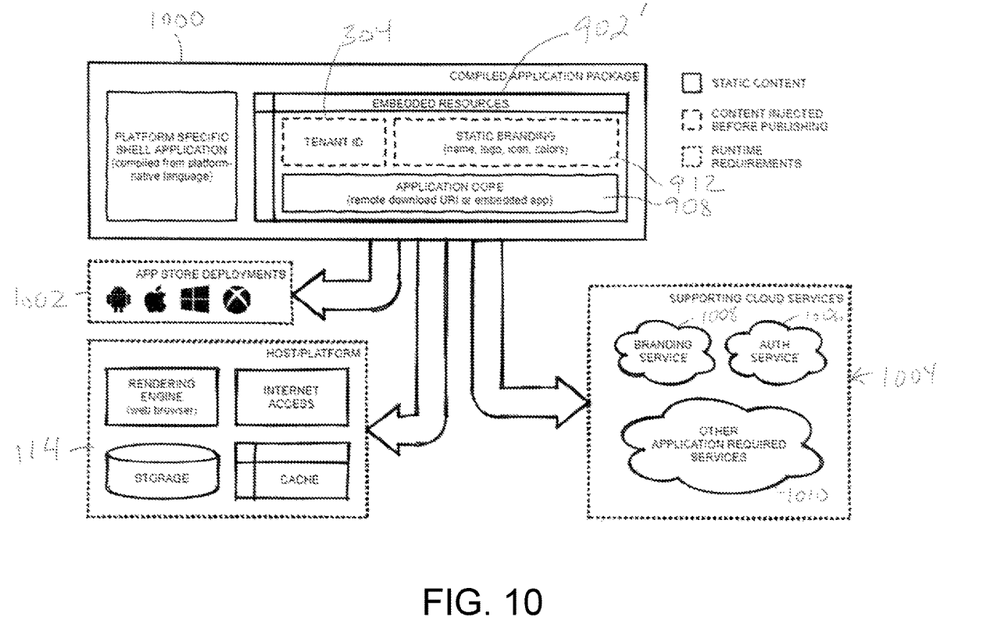
FIG. 10 illustrates a method for packaging a cloud-based, enterprise-customizable multi-tenant application and service interface according to the present disclosure in a unique platform-specific thin-client shell application for deploying to a third-party marketplace or platform.
Figure 11:
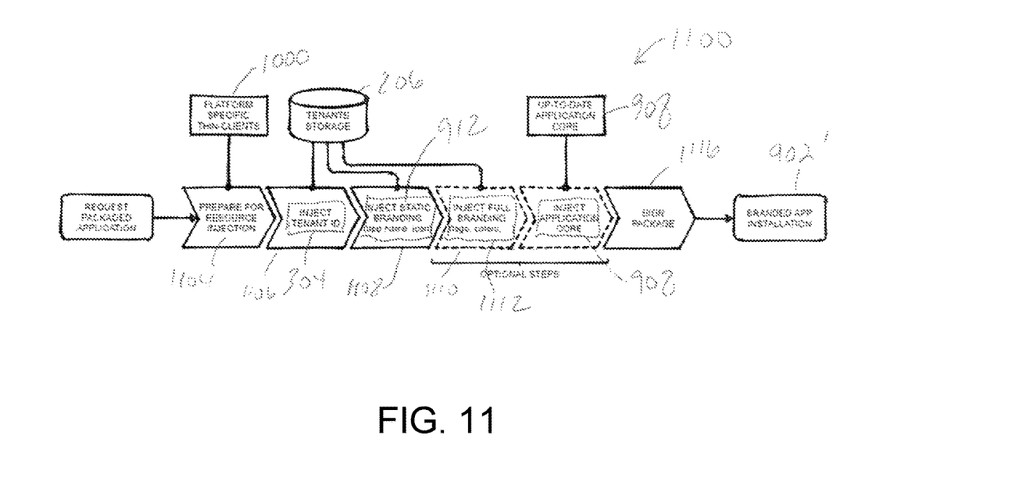
FIG. 11 illustrates alternative embodiments of the method depicted in FIG. 10.

Reference is now made to FIGS. 9-11. It will be appreciated that where appropriate like features from other drawings of the present disclosure are identified with like reference numerals. At a high level (see FIG. 9), as before a method 900 is provided whereby an enterprise defines the substance and features of the enterprise-customizable multi-tenant application and service interface 902 (see description above) using suitable services such as a cloud app builder 904. This portion of the process has been described in detail above, but at a high level a participating enterprise is identified at step 202 (see also FIG. 2) such as by detecting an enterprise domain or subdomain 308 (see also FIGS. 3 and 5) or other unique enterprise identifier 304 (see also FIG. 3). A set of predetermined enterprise customizations 906 according to the identified enterprise and an up-to-date/updated core application 908 providing the desired common core functionalities are fetched and assembled (step 110) to provide the enterprise-customizable service interface 902.

At the end of the process the enterprise is provided instructions on how to make the enterprise-customizable multi-tenant application and service interface 902 available to a user or enterprise as described above, for example in a Web browser environment. Additionally, an option 910 is provided to also select additional platforms to create native app versions for distribution by way of third-party marketplaces or platforms. At a high level, the up-to-date/updated core application 908 is compiled with a predetermined set of functionalities/resources/code which are determined and selected according to unique tenant identifier 304 to provide a fully embedded application 914 that may be provided to a third-party platform as a static enterprise-customizable multi-tenant application and service interface 902'.

With reference to FIG. 10 a unique platform-specific thin-client shell application 1000 is created that is configured with: 1) a unique tenant identifier 304 for the enterprise; 2) static branding assets 912 associated with the enterprise (as before, non-limiting examples include logos, color schemes, fonts, etc. above provided by the enterprise as part of building the enterprise-customizable multi-tenant application and service interface); and 3) core functionalities 908 of the enterprise-customizable multi-tenant application and service interface 902'. The unique platform-specific thin-client shell application 1000 is compiled from platform-native coding required for particular platforms, for example Google Play®, App Store®, Amazon Appstore, Microsoft Store, and others, for deployment and publishing to the relevant third-party platform 1002 or alternatively cached for retrieval (see FIG. 1).

In an embodiment the core functionalities 908 include a link to backend services hosted on one or more remote servers 1004, and the enterprise-customizable multi-tenant application and service interface 902' core functionalities are provided primarily by way of those backend services. Exemplary backend services 1004 may include without intending any limitation services such as authentication services 1006, branding services 1008, and other services 1010 (see also FIG. 2). This embodiment provides most convenience to the enterprise in terms of ease of upgrade and maintenance. As will be appreciated by the skilled artisan the desirable feature is preserved of a user interface specific to an organization with which the user is identified as belonging is assembled in real-time, including the organizations branding, any custom modules, style and similar customizations. Further, as before the assembly is transparent to the user. In other words, the user sees only the enterprise-branded and customized app/cloud-based service but is unaware that the specific enterprise-branded and customized app was assembled at runtime on accessing the user interface, rather than being hosted and maintained by the enterprise.

In other embodiments (see FIG. 11), a method 1100 provides that the enterprise-customizable multi-tenant application and service interface 902' is packaged with at least a portion of the full package of core functionalities provided statically, i.e. embedded therein. It will be appreciated that this embodiment still provides the thin-client model for distributing the enterprise-customizable multi-tenant application and service interface since the separation between the thin-client providing distribution by a particular third-party marketplace and the enterprise-customizable multi-tenant application and service interface core functionalities is maintained, and also that at least a portion of the real-time assembly/user transparency features are maintained. At step 1102 a request is received for the packaged enterprise-customizable multi-tenant application and service interface 902'. As before, a platform-specific thin-client application 1000 is retrieved and prepared at step 1104 for resource injection. From a remotely or locally stored database, at step 206 (see also FIG. 2) a specific pool of enterprise customizations 912 is fetched according to a unique tenant identifier 304. The tenant identifier 304 and the specific pool of enterprise customizations 912 are compiled in the platform-specific thin-client application 1000 at steps 1106 and 1108.

Optionally, at step 1110 a full set of enterprise customizations 1112 are injected into the platform-specific thin-client application 1000. The platform-specific thin-client application 1000 comprising the tenant identifier 304/enterprise customizations 912 and optionally full set of enterprise customizations 1112 may include a link to a remotely hosted up-to-date/updated core application 908 (allowing substantially full preservation of the features of real-time assembly and user transparency) or optionally at step 1114 the core application 908 may be injected into the platform-specific thin-client application 1000. At step 1116 optimization may be undertaken, which as before (see also FIG. 1) may variously include detecting an enterprise or enterprise customer desiring to use the app, verification of compatibility with the specific platform requirements including determinations of features such as operating systems, processor speeds, available memory, speed of internet or wi-fi connection, and others.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the foregoing description describes implementation of an enterprise-customizable multi-tenant application and service interface configured for providing access to cloud-based data/document storage. However, the skilled artisan will readily appreciate that the described system is equally applicable to service interfaces for other types of services amenable to provision in or from a cloud-based environment, such as mortgage apps, online banking apps, enterprise intranet apps, and innumerable others cloud-hosted services.

The described embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. In a cloud-hosted computing system environment, a method for transparently providing a customized enterprise-specific interface application to an identified third-party marketplace platform, comprising:
   receiving a front-end or a back-end request for a core functionality;
   identifying a specific enterprise associated with the request; and
   by an assembly program or a tenant service hosted by the cloud-hosted computing system environment, in real-time and transparently:
   i) selecting a core application defined for a group of enterprises requiring a same functionality as the core functionality;
   ii) according to the identified specific enterprise, applying one or more predefined stored functionalities to the core application to provide an identified-enterprise-specific interface application; and
   iii) packaging the identified-enterprise-specific interface application and a unique identifier associated with the specific enterprise for deployment in a platform-specific thin-client application shell to provide a platform and identified-enterprise-specific interface application.

2. The method of claim 1, including pushing the platform and identified-enterprise-specific interface application to the identified third-party marketplace platform or caching the platform and identified-enterprise-specific interface application for later pushing or retrieval.

3. The method of claim 1, including identifying the specific enterprise by one or both of an enterprise-associated domain or subdomain identifier and a unique authentication code.

4. The method of claim 1, including providing the one or more predefined stored functionalities as one or more stored files defining modules providing additional identified-enterprise-specific application functionalities, enterprise-specific templates, and enterprise-specific assets.

5. The method of claim 4, including providing the modules providing additional identified-enterprise-specific application functionalities selected from the group consisting of one or more of a plurality of user interface views, a plurality of menu options, a plurality of menu layouts, and a plurality of attendant services.

6. The method of claim 5, including providing the modules defining one or more enterprise-specific encryption services.

7. The method of claim 4, including providing the modules including one or more tags identifying enterprise-customizable core application elements.

8. The method of claim 7, including selecting the enterprise-customizable application elements from one or more of a plurality of cascading style sheet (CSS) properties, a plurality of shell colors, a plurality of button styles, a plurality of text font styles, and a plurality of image size and/or resolution definitions.

9. The method of claim 1, including providing the core application as a cloud-based document storage service.

10. The method of claim 1, further including confirming compatibility of the identified-enterprise-specific application with a computing system of the identified specific enterprise prior to the step of packaging for deployment.

11. In a cloud-hosted computing system environment, a method for transparently providing a customized enterprise-specific interface application to an identified third-party marketplace platform, comprising:

receiving a front-end or a back-end request for a core functionality;

identifying a specific enterprise associated with the request; and by an assembly program or a tenant service hosted by the cloud-hosted computing system environment, in real-time and transparently:

i) selecting a core application defined for a group of enterprises requiring a same functionality as the core functionality;

ii) according to the identified specific enterprise, applying one or more predefined stored functionalities to the core application to provide an identified-enterprise-specific interface application;

iii) applying a filtering step to determine a status of the identified specific enterprise; and iv) packaging the identified-enterprise-specific interface application and a unique identifier associated with the specific enterprise for deployment in a platform-specific thin-client application shell to provide a platform and identified-enterprise-specific interface application.

12. The method of claim 11, including pushing the platform and identified-enterprise-specific interface application to the identified third-party marketplace platform or caching the platform and identified-enterprise-specific interface application for later pushing or retrieval.

13. The method of claim 11, including identifying the specific enterprise by one or both of an enterprise-associated domain or subdomain identifier and a unique authentication code.

14. The method of claim 11, including providing the one or more predefined stored functionalities as one or more stored files defining modules providing additional identified-enterprise-specific application functionalities, enterprise-specific templates, and enterprise-specific assets.

15. The method of claim 14, including providing the modules providing additional identified-enterprise-specific application functionalities selected from the group consisting of one or more of a plurality of user interface views, a plurality of menu options, a plurality of menu layouts, and a plurality of attendant services.

16. The method of claim 15, including providing the modules defining one or more enterprise-specific encryption service.

17. The method of claim 14, including providing the modules including one or more tags identifying enterprise-customizable core application elements.

18. The method of claim 17, including selecting the enterprise-customizable application elements from one or more of a plurality of cascading style sheet (CSS) properties, a plurality of shell colors, a plurality of button styles, a plurality of text font styles, and a plurality of image size and/or resolution definitions.

19. The method of claim 11, including providing the core application as a cloud-based document storage service.

20. The method of claim 11, further including confirming compatibility of the identified-enterprise-specific application with a computing system of the identified specific enterprise prior to the step of packaging for deployment.

* * * * *